United States Patent [19]

Pâquet et al.

[11] 4,226,893

[45] Oct. 7, 1980

[54] PROCESS FOR THE PRODUCTION OF FOAM PRODUCTS SIMILAR TO EGG WHITE FROM MILK SERUM

[75] Inventors: Denis Pâquet; Kaing S. Thou; Charles Alais, all of Nancy, France

[73] Assignee: Agence Nationale de Valorisation de la Recherche (ANVAR), Neuilly, France

[21] Appl. No.: 936,250

[22] Filed: Aug. 24, 1978

[30] Foreign Application Priority Data

Aug. 14, 1977 [FR] France ................................. 77 27797

[51] Int. Cl.$^2$ ............................................... A23J 3/02
[52] U.S. Cl. ...................................... 426/564; 426/583
[58] Field of Search ................................. 426/564, 583

[56] References Cited

U.S. PATENT DOCUMENTS

| 3,930,039 | 12/1975 | Kuipers | 426/583 |
| 3,935,323 | 1/1976 | Feminella | 426/564 |
| 3,956,520 | 5/1976 | Aiello | 426/583 |

FOREIGN PATENT DOCUMENTS 670450  4/1952  United Kingdom .................... 426/564

Primary Examiner—Jeanette M. Hunter
Attorney, Agent, or Firm—Learman & McCulloch

[57] ABSTRACT

An egg white substitute is prepared by a process involving the acidification of milk serum at a pH of 2 to 6, heating between 45° and 80° C. for five to twenty minutes, then sudden cooling to a temperature comprised between 15° C. and 25° C. and subsequent alkalinization to a pH comprised between 7 and 9.

21 Claims, 1 Drawing Figure

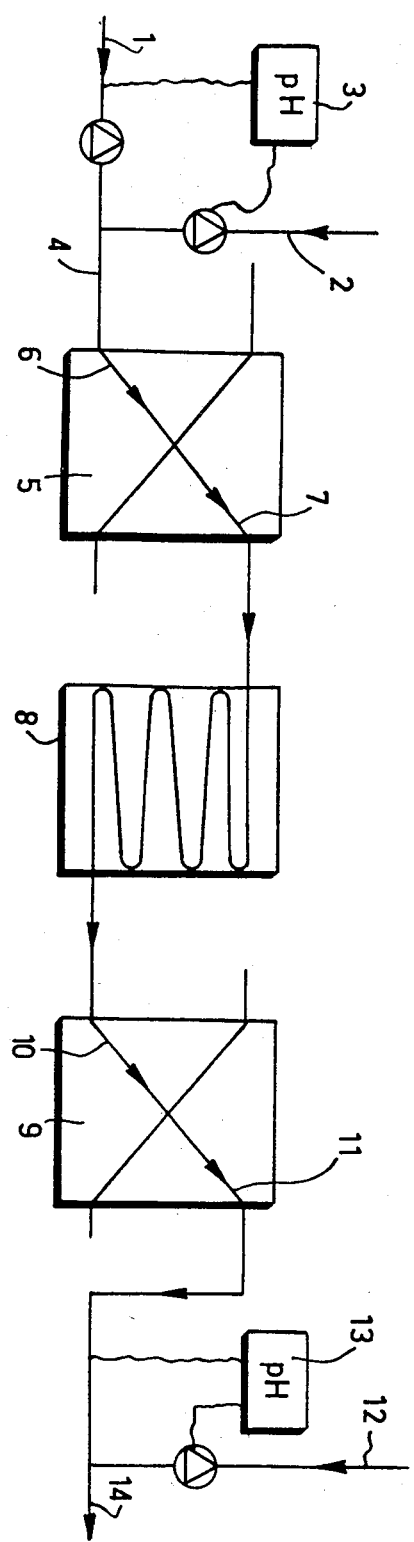

PROCESS FOR THE PRODUCTION OF FOAM PRODUCTS SIMILAR TO EGG WHITE FROM MILK SERUM

BACKGROUND OF THE INVENTION

1. Field of the Invention

The present invention relates to the use of proteins contained in milk serum. It relates more particularly to a process enabling the production from milk serum of foam products, which are consumable by man as food products.

The invention also relates to the foam products obtained thereby, and to the foods made therefrom.

2. Description of the Prior Art

Milk serum, a byproduct of the cheese industry has long been considered as a bulky liquid effluent of little value, of which only a small portion was kept for animal feeding.

In recent years, the battle against pollution and the search for proteins for food materials, have led the industry to use the proteins of milk serum more and more in the manufacture of foodstuffs.

Thus, milk serum is employed today in animal feeding, in bread making, in pastry making, in pork butchers products and in beverage manufacture.

As a document illustrating the prior art in the field of the valorization of milk serum for the food industry, the article of MANN [E. J. Dairy Industries August (1974) and September (1974)] may be mentioned.

Among the uses suggested, it has been proposed to exploit the foaming properties of the proteins of milk serum to replace the proteins contained in egg white, which are expensive and which are presently used in pastry manufacture for making cakes such as notably meringues, marshmallow, nougat or the like.

The milk serum containing substances which prevent the foam formation from the proteins that it contains, it cannot be used as much as such and requires preliminary processing.

It has been proposed in JELEN P., J. of Diary Science 56, (12), (1973) to remove a portion of the proteins of the milk serum by precipitation of the latter at a temperature of 95° C. at a pH of 4.5, and then taking up the supernatant liquor, concentration, removal of lactose by crystallization in the cold and decantation.

Another process described in Mc DONOUGH F. E., HARGROVE R. E., POSATI L. P. ALFORD J. A. J. of Diary Science 57 (12), (1974), consists of the ultrafiltration of the milk serum, then of a heating step at a temperature above 65° C. at a pH comprised between 5 and 8 to reach a protein concentration equal to 50%.

KUEHLER C. A. and STINE C. M. J. of Food Science 39, (1974) have proposed a process for the treatment of milk serum by filtration on a gel of the latter and subsequent enzymatic hydrolysis.

In Netherlands Milk and Diary Journal—Vol. 29 (1975) pages 198–211, J. DE WITT et al, there is described the ultrafiltration of whey or milk serum from cheese making, and the study of some functional properties of the protein concentrates of the serum resulting therefrom (ultrafiltration retentate). The preparation of a product having particular organoleptic properties has not been sought. The protein concentrates obtained by ultrafiltration of whey or milk serum, have a content of said proteins equal to 48.5%.

In the Netherlands Milk and Dairy Journal publication, the study carried out bears on protein concentrates of whey, that is to say on protein concentrates obtained by ultrafiltration of serum, and constituting the retentate outlined in the course of the ultrafiltration.

It follows necessarily that the products treated according to the process of the invention or subjected to the different analyses of the publication mentioned, are not of the same nature since according to the invention the content of proteins of the milk serum treated is of the order of 2 to 15%, whereas in the Netherlands Milk and Dairy Journal it is indicated that the protein content is equal to 48.5%.

British Pat. No. 670,450 (J. LENDERINK) relates to a process for the manufacture of products based on albumin capable of forming foam, and their application in foodstuffs.

This process consists of mixing a suspension or a solution of proteins previously hydrolysed with a hydrolysing agent other than an alkaline earth hydroxide, said solution or suspension containing both a substantial proportion of polypeptides and of non-hydrolysed proteins, with a calcium based compound capable of forming calcium ions in said solution or suspension.

The treated products are different since the process of British Pat. No. 670,450 relates to the casein, the lactalbumin of the milk serum which have a well-determined composition, which is not to be confused with the milk serum treated according to the present invention.

In addition, in the process described in this patent, the precise treatment is not mentioned except that the use of an alkaline earth base is not required. In particular, it will be noted that reference is made to hydrolysis in an acid medium which is not defined, no condition of time, of pH or of temperature being mentioned.

In addition, U.S. Pat. No. 2,765,232 describes a process for the treatment of milk serum to obtain foam products, said process consisting of a precipitation of a part of the proteins at a pH of 3.0 to 4.7 and at a temperature of 65° to 95° C. by the addition of a nontoxic iron salt such ferric chloride at a concentration comprised between 0.0015 and 0.01 moles/L; the flocculate is rejected and the supernatant liquor serves then for the manufacture of the foam.

The aforementioned processes involve long preparation and in the case of U.S. Pat. No. 2,765,232 the selective precipitation of the proteins is difficult to control.

In addition, tests have revealed that the products obtained by these processes have disagreeable taste and smell, which in the foodstuffs field considerably reduces their attraction for human consumption.

Hence there exists at the present time a need for a process easy and inexpensive to apply, enabling the preparation from milk serum of foam products useful as egg white substitute and possessing substantially the organoleptic properties of the latter.

GENERAL DESCRIPTION OF THE INVENTION

The present invention constitutes a response to this need and provides a process for producing foam products useful as egg white substitute, characterized in that it consists of:

(a) bringing the pH of a milk serum based material having a protein content of the order of 2 to 15%, to a value comprised between about 2 and 6, (b) bringing for about one to ten minutes the temperature of this solution to a temperature comprised between about 45° C. and 80° C. and of maintaining said temperature for about 5 to 20 minutes;

(c) rapidly cooling the solution to a temperature comprised between about 15° and 25° C.;

(d) alcalinising said solution to a pH comprised between about 7 and 9, which leads to a liquid product directly suitable for foaming.

The milk serum based raw materials utilizable according to the invention may be of various origin; such as for example, milk serums or mixtures of milk serums from cheese making or from casein manufacture directly obtained in the manufacture of cheese or of casein. The process is also applicable to milk serum mother liquors.

It is also possible to use a milk serum concentrate or in powder form which is diluted to obtain the protein concentration desired comprised between 2 and 15% weight by volume.

From the organoleptic point of view, the best results are obtained by using ultrafiltration and dialysis retentates of the milk serum.

The milk serum need not have undergone any prior processing or have, on the other hand, been delactosed. In the same way, the milk serum may or may not have been subjected to demineralization. It should however be noted that foam products obtained from non-demineralized milk serum have a salty taste. It is hence preferable to proceed with a partial demineralization, which does not however have to be too intense, since a notable loss in stability of the foam formed by means of foam products obtained from milk serum demineralized by electrodialysis, has been observed. The appropriate level of demineralization will be determinable in each case by the technician through routine tests, according to the milk serums used and the foam products that it is desired to obtain.

In the present description, by "foam product" is meant a product which, similarly to egg white can acquire, for example, by the incorporation of air mostly by stirring with a whisk or whipping, a foam structure similar to that of "beaten egg white", that is to say a foam structure sufficiently stable to be handled for some minutes and to undergo baking in an oven or a stove at moderate temperature. These characteristics are well-known and are described notably in the aforementioned U.S. Pat. No. 2,765,232.

The protein concentration of the milk serum is usually comprised between 2% and 15% weight/volume, normally it will be comprised between 2 and 10% (W/V) for a whole milk serum. It can go up to 15% for ultrafiltration retentates.

In the course of step (a) the pH of the milk serum is brought to a value comprised between about 2 and 6. In the majority of cases, the milk serum used has a neutral or basic pH; it is hence necessary to acidify it to obtain the desired pH. Among the acids usable, the socalled food acids are particularly preferred, such as hydrochloric, sulphuric and lactic acids or mixtures of the latter.

In the case where the initial pH of the milk serum is already very acid, for example less than 2, the desired pH can be obtained by the addition of a base such as for example, soda, potash or lime or mixtures of the latter.

The pH of the milk serum during the heating step (b) exerts a determining effect on the stability of the foam produced subsequently from the foaming product obtained. Although satisfactory results are obtained with a pH comprised between 2 and 6, it is desirable that the latter should be comprised between 2 and 4 and preferably close to 2, which value corresponds to maximum stability for the foam.

The duration of the heat treatment (b) must be relatively short whatever the temperature comprised between 45° and 80° C. and preferably between 50° and 80° C. For a preheating period comprised between one and ten minutes, it must not exceed 20 minutes. Beyond this time, the stability of the foam obtained becomes less than 50% of maximum stability.

The heating can be effected by any suitable means currently used in this field and enabling local over-heating points to be avoided since they would exert an unfavorable influence on the proteins. Among adequate means may be mentioned the injection of steam in the double wall of a reaction vessel.

Of course, it is desirable to provide stirring means to produce homogeneity of temperature in the milk serum.

The cooling of step (c) of the process must be effected rapidly in order that the heating step (b) is not extended beyond the maximum duration acceptable which is 20 minutes as has been previously specified.

This cooling can be effected by any means known to the man skilled in the art and currently used to obtain a rapid fall in temperature. In the case of the aforementioned double walled reaction vessel, the injection of steam can be replaced by an injection of water or of any other liquid at low temperature.

It has been found that a good foaming product is only obtainable after neutralization or slight alkalinization; whipping the solution at the same pH as that of the acid heating does not enable good foam stability to be obtained. It is hence necessary after cooling of the milk serum at step (c) to alkalinize the latter to reach a pH comrised between about 7 and 9 and preferably equal to about 8. This alkalinization can be effected by the addition of any suitable base such as soda, potash or lime or mixtures of such bases.

The essential influence of the pH in the course of the heating step on the stability of the foam has already been previously mentioned, and it has now been found that the best stability of this foam is obtained by a ratio heating pH/whipping pH which is as small as possible, that is to say equal to 2/8, which corresponds to the preferred conditions of applying the process according to the invention.

The addition of adjuvants to improve the stability of the foam may be envisaged, notably when the conditions of applying the process are not the optimal conditions.

Thus, the addition of powdered sucrose before whipping the product enables a considerable increase in the stability of the foam, the increase in concentration of sucrose causing an increase in the firmness accompanied by a reduction in the volume of the foam.

The sucrose added to the product at a concentration of 50% (W/V) enables the production of the foam capable of being converted into meringues of a texture close to that obtained from egg white proteins.

The products obtained by the process of the invention may be used as such, but it is also possible to dry them to form a powder which is easier to store, to transport and to market.

In order not to alter the proteins it is desirable to proceed with drying under reduced pressure according to techniques currently used in this field.

It is also possible to proceed with drying of the "spray" type, that is to say, by atomization or spraying into a hot air enclosure.

The process according to the invention lends itself particularly well to continuous application as is indicated in the accompanying diagram in which a pipe 1 containing milk serum receives an amount of acid 2 such that its pH at 4 is comprised between 2 and 6, the addition of acid being controlled by a pH meter 3 including two detectors arranged respectively on the milk serum and acid supply pipes.

A heat exchanger 5 brings the temperature of the milk serum from ambient temperature at 6 to a temperature comprised between 45° C. and 80° C. at 7. The latter temperature is maintained for 5 to 20 minutes by a heat insulating device 8.

The temperature is then rapidly lowered by a heat exchanger 9 which brings said temperature in a few minutes from 45° C. to 80° C. at 10 to ambient temperature at 11.

The pH of the milk serum is then brought to a value comprised between 7 and 9 at 14 by the addition of a base at 12 controlled by the pH meter 13.

The accompanying diagram relates more particularly to a milk serum having an initial pH higher than 2; it is self-evident that in the case where the pH is less than 2, the addition of acid 2 is replaced by an addition of base.

The products obtained by the process of the invention may be used for the production of foams similar to the foams formed by beaten white of egg.

It is possible with the foam products according to the invention to make pastry of all kinds in a manner quite similar to currently-manufactured pastries and whose composition includes beaten egg white. Among such pastries, may be mentioned notably sponge cake, biscuits, macaroons, marshmallows, nougats and meringues. The foam products according to the invention are particularly suitable for the manufacture of meringues since they can be baked for example in a low-temperature oven.

DESCRIPTION OF PREFERRED EMBODIMENTS

The following examples of preferred embodiments of the process according to the invention are given purely by way of illustration and are not to be regarded as in any way limiting.

EXAMPLE 1

Into a tank of 500 liters equiped with a double wall, filled with the ultrafiltration retentate of milk serum, at concentration of 5% of protein, is added concentrated hydrochloric acid to bring the pH to 2.

The temperature is brought to 55° C. by the injection of steam into the double wall, in 10 minutes with average stirring, and this temperature is held for 5 minutes. It is rapidly cooled to 20° C. and then concentrated soda added to a pH of 7.

The product obtained was converted into foamed form by whipping in a manner similar to the treatment of white of egg. The foam obtained had good stability and was used after the addition of a suitable amount of sugar for the manufacture of meringues which were baked in a low-temperature oven.

The meringues obtained had the appearance and taste of meringues produced from egg white.

EXAMPLE 2

The process of the invention was carried out continuously in an apparatus according to the appended diagram.

The raw material (cheese milk serum or casein manufacture milk serum or milk sera mother liquors) at a concentration of 5% protein, was introduced continuously into the apparatus through piping 1. At this level, the pH meter 3 controlled the operation of the pump 2 which injected hydrochloric acid to bring the pH of the solution to 2. The solution then passed through the heat exchanger 5 where its temperature was brought from 20° C. to 55° C. in 2 minutes; it then passes for 10 minutes through the chamber or heat insulated device 8 which was regulated to a temperature of 55° C.

At the outlet from the heat adjusting chamber, the solution passed through the heat exchanger 9 in which its temperature passed from 55° C. to 20° C.

At the end of the cycle, the pH meter 13 controlled the operations of pump 12 which injected concentrated soda to bring the pH of the solution to 8.

The product thus obtained, supplemented with sucrose at a concentration of 50% (W/V) was convertible, after whipping, into meringues by baking in an oven at moderate temperature.

The following comparative examples are intended to show that suitable foaming products cannot be obtained when the specific conditions of the invention are not respected.

EXAMPLE 3 (In which the heating time of step (b) is not respected.)

Into a tank of 500 liters equiped with a double wall, filled with ultrafiltration retentate of milk serum at a concentration of 5% protein, was added concentrated hydrochloric acid to bring the pH to 2.

The temperature was taken to 55° C. by the injection of steam into the double wall, in 10 minutes, with average stirring and this temperature was maintained for 50 minutes. It was cooled rapidly to 20° C. and then concentrated soda added to a pH 8.

The product was put into foam form by whipping, but the stability of the foam obtained was about 50% less than that of the foam obtained in Example 1. The duration of heating was too long. The manufacture of meringues from this whipped product in the presence of sucrose at a concentration of 50% (W/V) was impossible on account of the rapid destabilization of the foam in the course of baking in the oven.

EXAMPLE 4 (in which the pH of step (d) is not respected)

After preparation of a reaction mixture identical to that of Example 1, and then a manufacturing process identical with that of Example 1 up to and including step (c), concentrated soda was added to a pH 10. The foam obtained was stable but possessed poor organoleptic properties, notably a very pronounced taste of ammonia which made it unsuitable for human consumption.

EXAMPLE 5 (in which the pH of step (a) is not respected)

Into a 500 liter tank equiped with a double wall filled with ultrafiltration retentate of milk serum at the concentration of 5% protein and at a pH 6.5, the temperature was brought to 55° C. without having acidified it previously to pH 2. The following steps were identical with those of Example 1. The foam obtained after whipping did not permit, through its bad stability (about 30% of the stability of the foam obtained in Example 1), the manufacture of meringues.

Of course, the invention is not limited to the embodiments specifically described and modifications could be introduced by the technician skilled in the art to the process without departing from the scope of the invention.

We claim:

1. Process for producing a foamable product useful as an egg white substitute, said process comprising:
   (a) taking the pH of a milk serum based solution having a protein content of the order of 2 to 15%, to a value comprised between 2 and 6;
   (b) bringing the temperature of said solution to a temperature comprised between about 45° C. and 80° C. within about 1 to 10 minutes and maintaining said temperature for about 5 to 20 minutes;
   (c) rapidly cooling said solution to a temperature comprised between about 15° and 20° C.; and
   (d) alkalinising said solution to a pH comprised between about 7 and 9.

2. Process according to claim 1, wherein the pH of step (a) is comprised between 2 and 4.

3. Process according to claim 1, wherein the ratio of the pH of step (a) is equal to 2.

4. Process according to claim 1, wherein the pH of step (d) is equal to 8.

5. Process according to claim 2, wherein the ratio of the pH of step (a) to the pH of step (d) is equal to 218.

6. Process according to claims 1, wherein the adjustment of the pH at step (a) is obtained by the addition of an acid such as hydrochloric acid, sulphuric or lactic acid, or of a base such as soda, potash or lime.

7. Process according to claim 1, wherein the pH adjustment at step (d) is obtained by the addition of a base such as soda, potash or lime.

8. Process according to claim 1, including initially partially demineralizing said solution.

9. Process according to claim 8, wherein said solution is a retentate of the ultrafiltration of milk serum.

10. Process according to claim 8, wherein said solution is a retentate of the dialysis of milk serum.

11. Process according to claim 1, wherein said solution is a retentate of the ultrafiltration of milk serum.

12. Process according to claim 1, wherein said solution is a retentate of the dialysis of milk serum.

13. Process according to claim 1, including a step of drying said solution.

14. Process according to claim 13, wherein the drying of said solution is accomplished under reduced pressure.

15. Process according to claim 13, wherein the drying of said solution is accomplished by atomization.

16. Process according to claim 13, wherein the drying of said solution is accomplished by spraying in a hot air enclosure.

17. A foamable substitute product for egg white produced by the process according to claim 1.

18. A product according to claim 17, wherein said product is in powder form.

19. In an otherwise conventional method of manufacturing pastries of the kind normally including foamed egg white, the improvement comprising substituting for said egg white a product produced according to claim 1.

20. A method according to claim 19, wherein said product is in powder form.

21. In an otherwise conventional pastry of the kind normally containing foamed egg white, the improvement comprising a product produced according to claim 1 in substitition for said egg white.

* * * * *

UNITED STATES PATENT AND TRADEMARK OFFICE
CERTIFICATE OF CORRECTION

PATENT NO. : 4,226,893
DATED : October 7, 1980
INVENTOR(S) : Denis Paquet et al

It is certified that error appears in the above-identified patent and that said Letters Patent are hereby corrected as shown below:

Column 1, line 40, change "Diary" to --Dairy--.

Column 1, line 48, change "Diary" to --Dairy--.

Column 1, line 56, change "Diary" to --Dairy--.

Column 2, line 42, change "L" to --1--.

Column 4, line 35, change "comrised" to --comprised--.

Column 7, line 32, change "218" to --2/8--.

Column 7, line 33, change "claims" to --claim--.

Signed and Sealed this

Twenty-seventh Day of January 1981

[SEAL]

*Attest:*

RENE D. TEGTMEYER

*Attesting Officer*     *Acting Commissioner of Patents and Trademarks*